United States Patent [19]

Mishima et al.

[11] Patent Number: 4,913,861

[45] Date of Patent: Apr. 3, 1990

[54] PROCESS FOR PREPARING CARBON FIBER-REINFORCED COMPOSITE MATERIALS

[75] Inventors: Tadao Mishima; Atsuo Mitani, both of Kanazawa; Takashi Yamamoto, Komatsu, all of Japan

[73] Assignees: Ishikawa Prefecture, Ishikawa; Nippon Oil Co. Limited, Tokyo, both of Japan

[21] Appl. No.: 292,656

[22] Filed: Dec. 28, 1988

Related U.S. Application Data

[63] Continuation of Ser. No. 33,336, Mar. 31, 1987, abandoned.

[30] Foreign Application Priority Data

Mar. 31, 1986 [JP] Japan .................................. 61-75108

[51] Int. Cl.⁴ .......................... D06H 7/00; B26F 3/00

[52] U.S. Cl. .......................................... 264/23; 83/14; 83/701; 156/73.2; 156/73.3; 225/1; 264/29.2; 264/103; 264/134; 264/138; 264/257

[58] Field of Search ................ 264/23, 160, 29.2, 103, 264/134, 138, 257; 225/1; 83/14, 22, 701; 425/174.2; 156/73.2, 73.3, 73.4

[56] References Cited

U.S. PATENT DOCUMENTS

| | | | |
|---|---|---|---|
| 2,954,587 | 10/1960 | Rasmussen | 264/23 |
| 4,198,461 | 4/1980 | Keller et al. | 264/23 |
| 4,414,045 | 11/1983 | Wang et al. | 264/23 |
| 4,440,819 | 4/1984 | Rosser et al. | 264/23 |
| 4,540,625 | 9/1985 | Sherwood | 264/23 |
| 4,581,185 | 4/1986 | Kelcher, Jr. | 264/23 |
| 4,605,454 | 8/1986 | Sayovitz et al. | 264/23 |
| 4,610,830 | 9/1986 | Zoller | 264/23 |

FOREIGN PATENT DOCUMENTS

| | | | |
|---|---|---|---|
| 1157695 | 7/1969 | United Kingdom | 264/23 |

*Primary Examiner*—Hubert C. Lorin

*Attorney, Agent, or Firm*—Scully, Scott, Murphy & Presser

[57] ABSTRACT

A carbon fiber-reinforced composite material is prepared by molding a textile weave-reinforced composite material using a plain textile weave obtained by weaving multifilament yarns comprising a plurality of substantially non-twisted carbon fiber filaments which have been bonded to each other with a sizing agent, wherein a yarn disintegrating step of breaking each bond between the filaments of yarns constituting said textile weave is included as a step preceding a composite molding step.

2 Claims, 2 Drawing Sheets

CARBON FIBER FILAMENTS

SIZING

WEAVING

DISINTEGRATING

MOLDING

PROCESS FOR PREPARING CARBON FIBER-REINFORCED COMPOSITE MATERIALS

This application is a continuation, of application Ser. No. 033,336, filed Mar. 31, 1987, now abandoned.

BACKGROUND OF THE INVENTION

This invention relates to a process for preparing composite materials such as synthetic resins and concrete reinforced with carbon fibers. More particularly, the present invention is concerned with a process for preparing carbon fiber-reinforced composite materials wherein textile weaves obtained by weaving yarns made of carbon fibers are used as a reinforcer.

Carbon fiber-reinforced composite materials wherein textile weaves obtained by weaving yarns made of carbon fibers are used as a reinforcer for synthetic resins or conrete are well known.

Monofilaments made of carbon fibers used for such composite materials are as fine as 7μ to 10μ. In weaving carbon fibers, about 1000 to 6000 monofilaments are bonded to one another with a sizing agent to form a yarn. The yarns thus obtained are woven into a textile weave. Since the monofilaments constituting the above-mentioned yarn are substantially untwisted, bonding the monofilaments to one another with a sizing agent is indispensable to prevent breaking of them during weaving for attaining smooth weaving. In general, such yarns have a flat crosssection, and the dimension of the crosssection is, e.g., of the order of 2 mm in width and 0.15 mm in thickness.

Conventionally, the textile weave obtained by weaving yarns comprising aggregations of monofilaments bonded to one another with a sizing agent was impregnated as such with a synthetic resin or the like and molded into composite materials such as prepreg.

In general, when an external force acts on a composite material containing a carbon fiber, it acts on the carbon fiber as a tensile force, and the strength of the composite material is greatly influenced by the effective tensile strength of the carbon fiber. That is, the larger the content of the carbon fiber in the composite material which substantially bears the stress, the greater the extent of improvement in strength of the composite material. Further, the more parallel the stress acts on the filaments of the carbon fiber, the greater the extent of improvement in substantially strength of the composite material.

Therefore, in a composite material reinforced with a textile weave made of a carbon fiber, the more densely the textile weave is arranged in the composite material and the more parallel the external force acts on the yarns constituting the textile weave, the greater the extent of improvement in strength of the composite material.

However, a factor which spoils the strength inevitably exists in composite materials wherein textile weaves are used as a reinforcer.

Specifically, since warps and wefts constituting a textile weave interlace zigzag as shown in FIG. 3 (*b*), an angle of $\theta$ is made between the face of the textile weave 1 and the direction of the yarn 2 located between the crossing points P and Q, which leads to lowering in effective strength of the yarn 2. FIG. 6 is a graph showing how the strength of a synthetic resin plate wherein carbon fiber filaments doubled parallel are used as a reinforcer varies depending on the angle of $\theta$ (see FIG. 5) between the direction of application of an external force F and the direction T of the carbon fiber, and shows that an increase in $\theta$ brings about a rapid decrease in strength.

Further, in FIG. 2 (*a*) showing a plain of the textile weave 1, empty regions 4 in which yarns 2, 3 are absent are inevitably formed between the warps 2 and the wefts 3, and the presence of the empty regions 4 leads to not only lowering in density of the carbon fiber contained in the composite material but also molding with the empty regions 4 remaining unfilled with a synthetic resin or conrete, which results in molding of a composite material having an incomplete texture in which a number of bubble-like voids are present.

The widening of the intervals between the yarns 3 for the purpose of decreasing the value of $\theta$ in FIG. 2 (*b*) to improve the strength results in widening of the empty regions 4 in FIG. 2 (*a*). After all, in a carbon fiber-reinforced composite material wherein a textile weave made of a carbon fiber is used as a reinforcer, the carbon fiber cannot bear the stress in an ideal form, which leads to an inevitable disadvantage of lowering in strength attributable to it.

SUMMARY OF THE INVENTION

An object of the present invention is to eliminate the drawbacks accompanying the above-mentioned prior art methods, and, more specifically, to greatly improve the strength of a carbon fiber-reinforced composite material wherein a textile weave made of a carbon fiber is used as a reinforcer.

The present invention consists in a process for preparing a carbon fiber-reinforced composite material comprising molding a textile weave-reinforced composite material using a plain textile weave obtained by weaving multifilament yarns comprising a plurality of substantially non-twisted carbon fiber filaments which have been bonded to each other with a sizing agent, characterized in that the process includes a yarn disintegrating step of breaking each bond between filaments of yarns constituting said textile weave as a step preceding to a composite molding step.

DETAILED DESCRIPTION OF THE INVENTION

Figure 1:
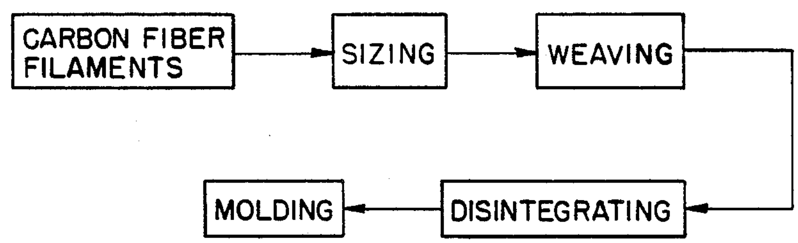
FIG. 1 is an illustrative view of the process for preparing a carbon fiber-reinforced composite material according to the present invention.
Figure 2A:
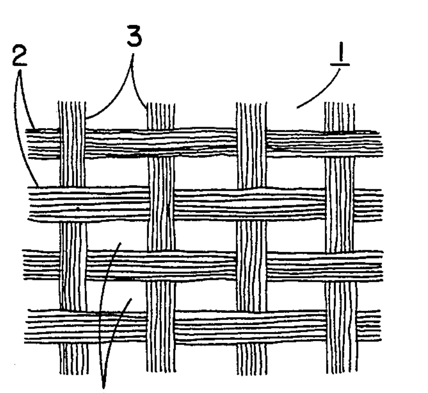
FIGS. 2 (*a*) and (*b*) are depicted views of a plain view and a crosssectional view of a textile weave before yarn disintegration, respectively.
Figure 3A:
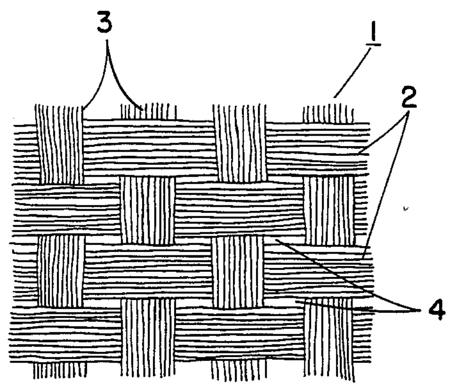
FIGS. 3 (*a*) and (*b*) are depicted views of a plain view and a crosssectional view of a textile weave after yarn disintegration, respectively.
Figure 2B:
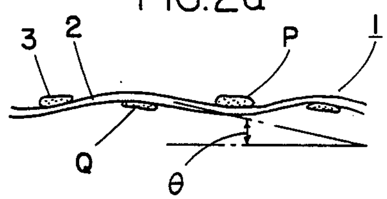
Figure 3B:
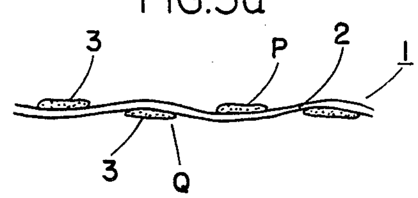

According to the present invention, in molding a composite material by impregnating a textile weave made of a carbon fiber with a synthetic resin or concrete, a step 12 of disintegrating yarns 2,3 constituting textile weave 1 made of a carbon fiber is provided as a step 11 preceding a step of molding a composite material, as shown in FIG. 1. As mentioned above, the yarns 2,3 constituting the textile weave 1 comprises a plurality of monofilaments which have been bonded to each other with a sizing agent. In the above-mentioned yarn disintegrating step, the bondings between the monofilaments through a sizing agent are disintegrated to form a texture in which the constraints between the monofilaments constituting a yarn have been eliminated. The yarn disintegrating step enables the monofilaments of each yarn from which the bondings therebetween have been eliminated to be mutually moved freely, leading to spreading of the yarns 2,3 in the width direction, which causes the thickness of the textile weave 1 to be reduced. Specifically, when the yarns 2,3 are bonded to each other with a sizing agent, the textile weave 1 has a crosssection and a plain texture as shown in FIGS. 2 (*a*) and (*b*). Such a weave is converted into a weave having a crosssection and a plain texture as shown in FIGS. 3 (*a*) and (*b*) through the yarn disintegrating step. The spreading of the yarns 2,3 of the textile weave 1 through the disintegration decreases the empty-regions 4 of the textile weave 1 as well as the thickness of the textile weave, which leads to the decrease in angle θ between the yarn 2 located between the crossing points P and Q of the textile weave 1 and the face of the textile weave. Therefore, the molding of a composite material after a yarn disintegrating step 12 leads to an improved strength by virtue of the decrease in the above-mentioned angle θ of the carbon fiber and prevents formation of voids 4 within the composite material as well as contributes to an improved strength by virtue of uniformalized distribution of the carbon fiber and by virtue of an increase in content of the carbon fiber attributable to an increase in number of the textile weaves 1 per given thickness because of the decrease in thickness of the textile weave 1. Further, since the monofilaments constituting the yarns 2,3 are spread, the permeation of a resin or conrete into the yarns 2,3 is improved, enabling a dense composite material having an improved strength to be obtained.

The sizing agent used for bonding between the monofilaments constituting the yarns of the carbon fiber may be known ones which have conventionally been used in this field. Examples of such an agent include epoxy resin, acrylic resin, and polyvinyl alcohol.

Figure 4:
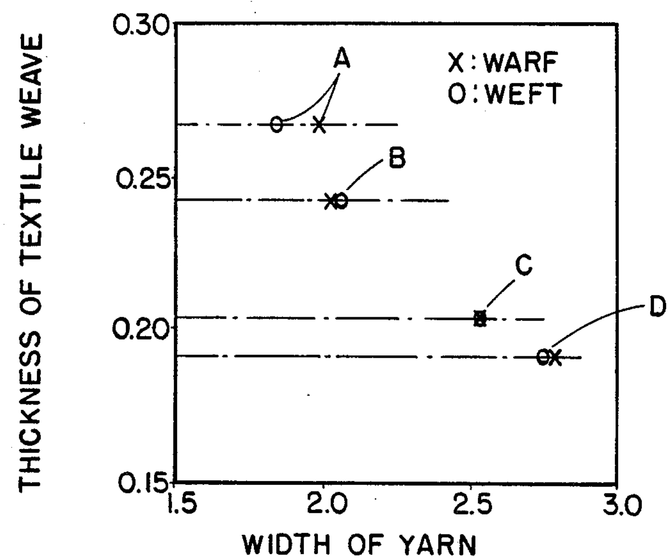
FIG. 4 is a graph illustrating the change in width of a yarn and thickness of a textile weave accompanying yarn disintegration.
Figure 5:
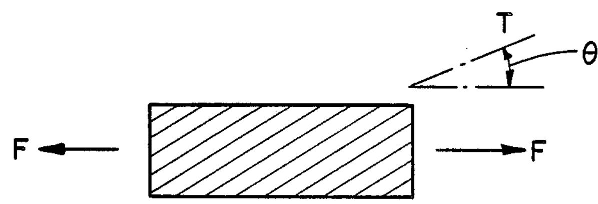
FIG. 5 is an illustrative view of a strength test on a carbon fiber-reinforced composite material using an angle $\theta$ between the direction of the carbon fiber and that of the tensile force as a parameter.
Figure 6:
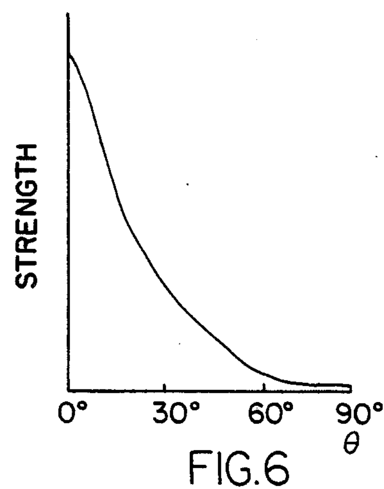
FIG. 6 is a graph showing the relationship between the angle $\theta$ and the strength of the carbon fiber-reinforced composite material in the test shown in FIG. 5. In the drawings, numeral 1 designates a textile weave, numerals 2 and 3 each a yarn, and numeral 4 an empty region, and letters P and Q each designate a crossing point in a textile weave.

The method of disintegrating yarns in the yarn disintegrating step 12 may be any one capable of breaking the bonding between the monofilaments through a sizing agent, and an appropriate method known in the field of synthetic fibers can be used. Specific examples of such methods include a method in which the sizing agent is dissolved, e.g., dissolution of the epoxy resin by means of an organic solvent such as butyl acetate, a method in which ultrasonic waves are applied thereto in water or hot water, and a method in which physical impact force is applied thereto while applying ultrasonic waves. These methods may be used alone or in any combination thereof. The method of applying a physical impact force includes a method in which the textile weave is softly beaten and a method in which the textile weave is exposed to a bubble stream in water. FIG. 4 shows the relationship between the width of yarns constituting a textile weave after yarn disintegration and the thickness of the textile weave, as determined with respect to textile weaves produced by weaving yarns made of 3000 carbon fiber monofilaments which have been bonded to each other with a sizing agent comprising an epoxy resin as warp and weft at a warp density of 2.5 yarns/mm and a weft density of 4.0 yarns/mm and not subjecting the resulting weave to any yarn disintegration (A), subjecting the resulting weave to yarn disintegration in such a manner that the weave is immersed in a solvent (B), subjecting the resulting weave to yarn disintegration in such a manner that the weave is immersed in a solvent, and ultrasonic waves are applied thereto for about 1 min in hot water (C), or subjecting the resulting weave to yarn disintegration in such a manner that the weave is immersed in a solvent, and ultrasonic waves and physical impact force produced by beating are simultaneously applied thereto (D). As can be seen from FIG. 4, yarn disintegration leads to an increase in width of yarns and a decrease in thickness of the textile weave. Particularly, the application of ultrasonic waves greatly widens monofilaments, which contributes to a decrease in the thickness of the textile weave.

The following table lists the rate of decrease in thickness, area of one empty region and angle θ of the warp between the crossing points P and Q with respect to textile weaves, which have been calculated based on the results as shown in Table 4. As can be seen from the table, the adoption of a yarn disintegration step brings out values on each item which leads to an improvement in strength of the composite material. In the table, symbols A to D correspond to the symbols A to D as shown in Table 4, respectively.

| | Rate of decrease in thickness | Area of empty region | θ |
|---|---|---|---|
| A | 1.00 | 14 $mm^2$ | 3° 49′ |
| B | 0.91 | 9 $mm^2$ | 3° 28′ |
| C | 0.76 | 0 | 2° 55′ |
| D | 0.72 | 0 | 2° 41′ |

When water-soluble sizing agents such as polyvinyl alcohol or acrylic resins are used, the yarns can be disintegrated using known refining solutions which have been commonly employed. Also in this case, the application of ultra-sonic waves etc. contributes to more smooth and complete yarn disintegration, and a composite material having an excellent strength can be prepared by this method according to the present invention.

As is apparent from the foregoing description, according to the present invention, the disintegration of yarns of a textile weave in the yarn disintegration step leads to a decrease in thickness of carbon fiber textile weaves to be packed into a composite material, which enables the amount of the reinforcer per unit thickness of a molding to be increased and empty regions of the textile weave to be decreased or eliminated, thereby making it possible to produce a composite material having a uniform and dense textile weave. Further, this not only contributes to prevention of occurrence of space in the textile weave, leading to an improvement in moldability, but also decreases the angle of inclination attributable to crossing of the warps with the wefts. The synergistic action of these effects greatly improves the strength of a composite material wherein a textile weave made of a carbon fiber is used as a reinforcer.

Further, in the present invention, since the bonding between the monofilaments constituting each yarn of a textile weave are broken and the monofilaments are spread, the impregnation of yarns with a resin or conrete can be improved, enabling formation of a composite structure in which each of the carbon fiber monofilaments are firmly bonded to a resin or concrete, which also contributes to an improvement in strength of the composite material.

What is claimed is:

1. In a process for preparing a carbon fiber-reinforced composite material comprising molding a textile weave-reinforced composite material using a plain textile weave obtained by weaving multifilament yarns comprising a plurality of substantially non-twisted carbon fiber filaments which have been bonded to each other with a sizing agent, the improvement wherein preceding the molding of the textile weave, the process includes a yarn disintegrating step of applying ultrasonic waves to said textile-weaves in water, thereby breaking the bonds between the filaments of yarns constituting said textile weaveto thereby produce the composite material with improved strength.

2. A process according to claim 1, wherein said yarn disintegrating step comprises a step of simultaneously applying ultrasonic waves and physical impact force to said textile weave.

* * * * *

UNITED STATES PATENT AND TRADEMARK OFFICE

CERTIFICATE OF CORRECTION

PATENT NO. : 4,913,861

DATED : April 3, 1990

INVENTOR(S) : Tadao Mishima, et al.

It is certified that error appears in the above-identified patent and that said Letters Patent is hereby corrected as shown below:

Column 3, line 47: "conrete" should read as --concrete--

Column 6, line 10, Claim 1: "weaveto" should read as --weave to--

Signed and Sealed this

Twelfth Day of November, 1991

*Attest:*

HARRY F. MANBECK, JR.

*Attesting Officer*

*Commissioner of Patents and Trademarks*